United States Patent [19]
Phillips

[11] Patent Number: 5,802,919
[45] Date of Patent: Sep. 8, 1998

[54] YOKE APPARATUS FOR RACK AND PINION

[75] Inventor: Edward H. Phillips, Troy, Mich.

[73] Assignee: Techco Corporation, Southfield, Mich.

[21] Appl. No.: 630,369

[22] Filed: Apr. 10, 1996

[51] Int. Cl.[6] ...................................... F16H 1/04
[52] U.S. Cl. ......................... 74/422; 74/89.11; 74/89.19; 384/37
[58] Field of Search ......................... 74/422, 339, 89.11, 74/89.19; 384/37, 119

[56] References Cited

U.S. PATENT DOCUMENTS

| | | | |
|---|---|---|---|
| 3,499,691 | 3/1970 | Baier | 384/119 |
| 3,680,443 | 8/1972 | Jenvey . | |
| 4,271,716 | 6/1981 | Carduner | 74/422 |
| 4,402,618 | 9/1983 | Fortmann | 384/119 |
| 4,475,413 | 10/1984 | Higuchi . | |
| 4,515,486 | 5/1985 | Ide | 384/119 |
| 4,683,769 | 8/1987 | Mochizuki et al. . | |
| 4,709,593 | 12/1987 | Takeuchi . | |
| 4,793,433 | 12/1988 | Emori et al. . | |
| 4,936,157 | 6/1990 | Kotake et al. . | |
| 4,939,947 | 7/1990 | Toyoshima et al. . | |
| 5,058,448 | 10/1991 | Kiyooka et al. . | |
| 5,203,216 | 4/1993 | Hasegawa . | |
| 5,265,691 | 11/1993 | Konishi et al. . | |
| 5,272,933 | 12/1993 | Collier et al. . | |
| 5,316,043 | 5/1994 | Phillips . | |

FOREIGN PATENT DOCUMENTS

| | | |
|---|---|---|
| 61-193966 | 8/1986 | Japan . |
| 6-92243 | 4/1994 | Japan . |

OTHER PUBLICATIONS

Chilton—Taurus/Sable/Continental, Suspension and Steering, 1986–89, Book 7830, p. 329.

Primary Examiner—Charles A. Marmor
Assistant Examiner—David M. Fenstermacher
Attorney, Agent, or Firm—Gifford, Krass, Groh, Sprinkle, Patmore, Anderson & Citkowski, P.C.

[57] ABSTRACT

A yoke assembly for a rack and pinion steering system includes a bearing disc member having a pair of bearing surfaces for slidingly supporting and urging the rack toward the pinion. The bearing disc member is kinematically supported by an elastomeric member. The elastomeric forces are conically applied toward an apex located well within the rack and away from the bearing surfaces. This results in the bearing disc member rotating slightly in a contra-pitch direction and forming a lubrication wedge whenever the rack moves along its axis of translation. The yoke assembly is of a compact design that can be substituted for the yoke assembly of any conventional rack and pinion steering system.

9 Claims, 2 Drawing Sheets

YOKE APPARATUS FOR RACK AND PINION

BACKGROUND OF THE INVENTION

I. Field of the Invention

The present invention is directed to a yoke apparatus for use with a rack-and-pinion steering system.

II. Description of the Prior Art

Automotive steering systems typically include a housing having a rack driven by a pinion gear. Rotation of a steering wheel turns the pinion gear. The pinion gear meshes with a plurality of teeth formed on the rack to drive the rack in one of two reciprocal directions. The rack in turn is connected to a pair of dirigible wheels. In addition, many automobile steering systems comprise a rotary control valve which is operable to supply pressurized fluid to move a double-acting hydraulic cylinder or actuator to assist translation of the rack.

In order to keep the teeth of the pinion gear and the rack in engagement, such steering systems employ a yoke apparatus. The yoke apparatus includes a bearing member which is biased to force the rack towards the pinion gear. The bearing member has a pair of spaced apart bearing surfaces which slidingly contact the surface of the rack opposite the teeth of the rack. The bearing member is slidingly mounted in a bore which is formed in a nominally orthogonal manner with reference to the rack's intended position. This results in a nominal alignment of the bearing surfaces along an axis which extends coaxially with the axis of translation of the rack. A spring is mounted in the bore to force the yoke assembly against the rack and bias the bearing surfaces in order to force the teeth of the rack against the teeth of the pinion gear. Thus, the yoke apparatus operates to nominally guide the rack along the axis of translation and hold the teeth of the rack and pinion in mesh during the application of torque to the pinion gear.

In practice, it is not possible to maintain the axis of translation of the rack orthogonal to the axis of the bore. This is because of the tolerances involved in forming the bore, rack, and pinion gear. Accordingly, it has been found that the axis of translation of the rack may be angled with respect to the axis of the bearing surfaces of the bearing member, and may even undulate as a function of rotational motion of the pinion. When so misaligned, one end of each of the support surfaces engage the rack while opposite ends of the support surfaces are spaced away from the rack. As a further result, the bearing member itself may suffer angular misalignment within the bore and jam. In fact, such yoke assemblies may be said to be of a non-kinematic design or over constrained in at least one of the six degrees of freedom of movement.

For the above reasons, the rack is often held from smooth movement in one, or both, directions of travel. This is particularly so when the rack travels in a direction from the contacting ends towards the non-contacting ends of the support surface. The edges resist movement of the rack and the rack tends to hesitate and jerk in its movement. However, movement of the rack in an opposite direction tends to produce a smoother, less resistant movement. Frequently, the discontinuous or halting movement of the rack will be tactilly sensed by the driver.

The spring is located in an adjuster plug which is threadably inserted in the outer portion of the bore. During the assembly of the yoke apparatus, the adjuster plug is rotatably driven into contact with the bearing member with a nominal torque value of perhaps 50 in.lbs. to provide a rotational position reference. Because of the above noted tolerances involved in forming the bore, rack and pinion gear, there results a soft contact between the adjuster plug and the bearing member, and thus an imprecise rotational position reference. For this reason, the adjuster plug must then be backed off by an angle of about 30° in order to ensure interference free operation in the manner described above. This results in an indefinite stop position of the bearing member should a torque level be applied that is sufficient to overcome the spring bias.

In operation, rack and pinion assemblies are often subject to a condition known as "rattle". Rattle most often occurs when the dirigible wheels are subject to dissimilar impacts such as when crossing obliquely disposed railroad tracks or similar road surface discontinuities. One cause of rattle is thought to be physical separation followed by abrupt re-engagement of the rack and pinion gear interface as a consequence of such dissimilar impacts. Lateral and rotational motions and resulting impacts within the housing by the yoke apparatus elements are thought to contribute as well. In any case, rattle is typically treated by tightening up various clearances or adding elastomeric guide elements, and as a last resort, by significantly increasing the biasing spring force.

SUMMARY OF THE INVENTION

Accordingly, a primary object of the present invention is to provide a yoke apparatus having a true kinematic design that being wherein bearing surfaces support the rack properly without over or under constrainment in all six degrees of freedom of movement. Thus, the bearing surfaces are maintained in coaxial alignment with the axis of movement of the rack to provide smooth, constant movement of the rack in both directions of travel. Another object of the present invention is to provide a yoke apparatus enabling substantially rattle free operation of the rack and pinion assembly.

Accordingly, in a preferred embodiment of the present invention, an improved first yoke apparatus is presented wherein a bearing disc is biased to force the rack towards the pinion gear by an elastomeric O-ring member. The bearing disc is constrained in the lateral directions with reference to a supporting adjuster plug by the 0-ring member. This is accomplished by compressing the O-ring member between inner and outer angular contact grooves respectively formed on the bearing disc and adjuster plug, respectively. The adjuster plug is used to axially compress the O-ring member in order to provide the biasing force. Because of the compliant nature of the O-ring member, the above described over constraint is eliminated.

As a consequence of its axially directed compression, the O-ring member provides nominal pitch and yaw constraints upon the bearing disc which are conically directed toward an apex. The actual location of the apex is determined by the relative final locations of the lines of force through the angular contact grooves. In any case, the pitch constraint is directed about the apex which is located well within the rack and thus physically remote from the bearing disc. Upon initial translation of the rack, the bearing disc begins to move along with the rack. This tends to decompress the portion of the O-ring member under the leading edge of the bearing disc and further compress the portion of the O-ring member under the trailing edge of the bearing disc. The end result is a contra-pitch rotation of the bearing disc about the apex so as to form a lubrication wedge like that of a sliding bearing between it and the rack. Thus, the bearing surfaces of the bearing disc can compliantly align with the preferred axis of movement of the rack in a manner that provides enhanced lubrication.

In a first alternative preferred embodiment of the present invention, an improved second yoke apparatus is presented wherein the elastomeric member is formed directly within the adjuster plug. In this case, the elastomeric member is formed within a nominally outer angular contact region such that the resulting force direction is similar to that of the preferred embodiment. In addition however, the angular contact groove on the bearing disc is partially relieved under the leading/trailing edge portions thereof. This results in a reduction of the pitch stiffness of the elastomeric support for the bearing disc with the further result of allowing selective lubrication wedge optimization. It also eliminates handling a separate elastomeric member during assembly.

In a second alternative preferred embodiment of the present invention, an improved second yoke apparatus is presented wherein first and second elastomeric members are formed directly within first and second cavities formed in the bearing disc. The first and second cavities are located in the lateral portions of the bearing disc and formed with physically interlocking shapes. This is required because the bearing disc is typically formed from plastic material to which the elastomeric material will not readily bond. In any case, the result is similar to that achieved in the first alternative preferred embodiment.

Any of the yoke apparatus may be exchanged for a conventional yoke apparatus with no other modification to the system. They provide improved on-center feel and improved steering performance generally. Their kinematic design permits the axis of the bearing surfaces of the bearing disc to be in precise alignment with the rack and maintain a lubrication wedge therebetween which enables smooth movement of the rack.

Further, since all of the necessary constraints are elastomerically provided, the bearing disc is not required to be slidingly mounted in a bore in the housing. Thus, there is no possibility of rattle occurring via contact between the bearing disc and such a bore. In addition, because all of the constraints are elastomerically provided, engagement of the teeth of the pinion gear and the rack is maintained in a less abrupt manner. Should physical separation therebetween result from a dissimilar impact, reengagement is softer and somewhat damped. In this way, raffle due to gear re-engagement is minimized as well.

BRIEF DESCRIPTION OF THE DRAWING

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENTS

Figure 1:
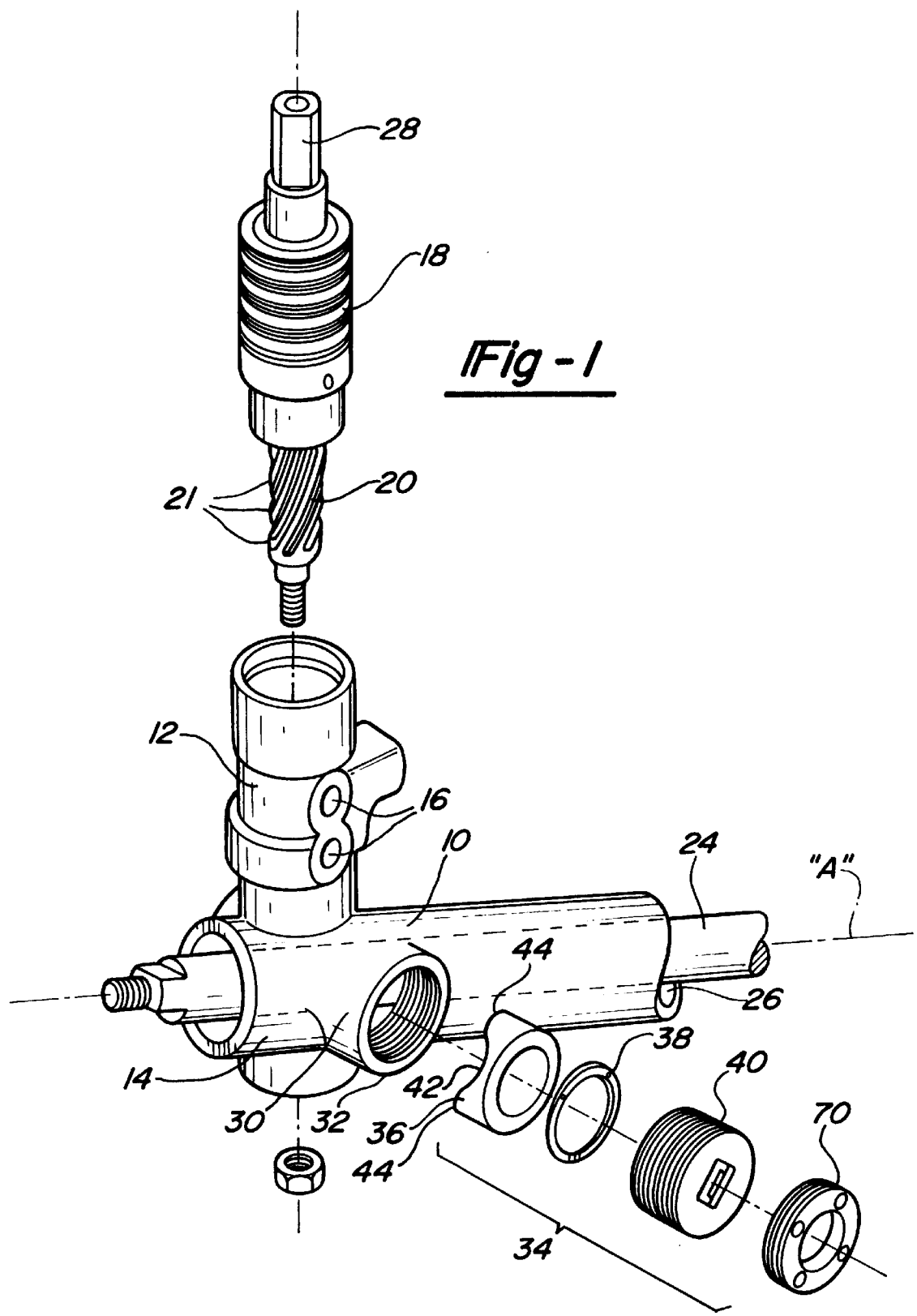
FIG. 1 is an exploded perspective view of a steering gear assembly including a yoke apparatus configured in accordance with a preferred embodiment of the invention.

Referring now to the exploded perspective view of FIG. 1, thereshown is a portion of a steering apparatus for a vehicle. The steering apparatus includes a conventional housing 10, such as manufactured by the Saginaw Steering Systems Division of Delphi Automotive Systems, of Saginaw, Mich. The housing includes a barrel 12 extending upwardly from a cylinder 14. The barrel 12 houses a rotary control valve assembly 18 for providing pressurized hydraulic fluid through ports 16 to a hydraulic actuator (not shown) for providing hydraulic assist to the steering system. Included in the rotary control valve assembly 18 is a pinion gear 20. The pinion gear is mounted to mesh with a plurality of teeth 22 (FIGS. 2 and 3) of a rack 24. The rack 24 is mounted for reciprocal movement along an axis of translation "A" in an elongated cavity 26 of the housing 10. As is known in the art, input shaft 28 of the rotary control valve assembly 18 is connected to a steering wheel (not shown) to enable steering of a host vehicle.

Figure 2:
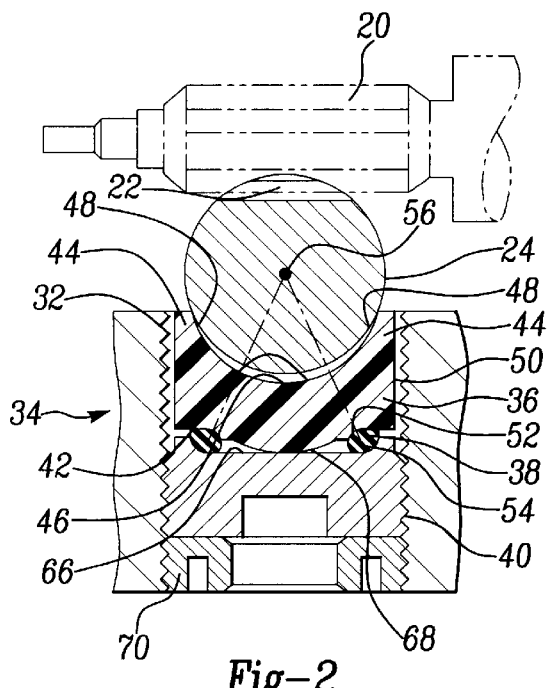
FIG. 2 is a sectional view of the yoke apparatus of the preferred embodiment of the invention.
Figure 3:
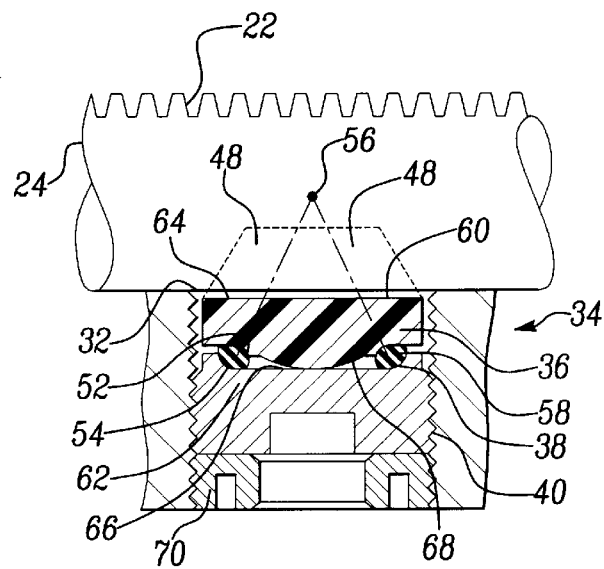
FIG. 3 is a sectional side view of the yoke apparatus of the preferred embodiment of the invention.

As shown in FIGS. 2 and 3, the teeth 22 extend in a nominally axial direction on the surface of the rack 24. The teeth 22 are formed to mesh with a plurality of teeth 28 formed on the pinion gear 20 so that rotational movement of the pinion gear 20 by the steering wheel and rotary control valve assembly 18 will cause reciprocal translation of the rack 24 along the axis of translation "A". As is known in the art, the rack 24 is connected to dirigible wheels (also not shown) to steer the vehicle.

As shown in FIG. 1, a cylindrical sleeve 30 is formed on one side of the cylinder 14 of the housing. The cylindrical sleeve 30 includes a threaded aperture 32 for accepting an improved yoke assembly 34 comprised in a preferred embodiment of the present invention. The threaded aperture 32 extends in a substantially orthogonal direction with reference to the axis of translation "A" of the rack 24.

The improved yoke assembly 34 includes a bearing disc 36, an elastomeric O-ring member 38 and an adjuster plug 40. When the improved yoke assembly 34 is assembled within the cylindrical sleeve 30, the bearing disc 36 is biased against the rack 24 by compression of the O-ring member 38 as is depicted more clearly in FIGS. 2 and 3.

As particularly shown in FIGS. 2 and 3, one side of the bearing disk 36 has a curvilinear slot 42 defining a pair of arms 44. The slot 42 includes a cutaway center portion 46 extending between a pair of elongated bearing surfaces 48. The bearing surfaces 48 are spaced apart to guide the rack 24 during movement thereof. The bearing disc 36 has a circumferential outer surface 50 having a diameter slightly less than the threaded aperture 32 of the cylindrical sleeve 30. The diametral operating clearance so obtained precludes the possibility of contact between the bearing disc 36 and the threaded aperture 32 and eliminates any possibility of rattle from that source.

The other side of the bearing disc 36 has an inner angular contact groove 52 and the juxtaposed side of the adjuster plug 40 has an outer angular contact groove 54. After assembly, the O-ring member 38 is compressed between angular contact grooves 52 and 54 to provide a biasing force that urges the bearing disc 36 into contact with the rack 24. Except for the lubrication wedge described below, the interface between the bearing surfaces 48 and the rack 24 provides lateral, radial, pitch and yaw constraints for the bearing disc with respect to the axis of translation "A". Lateral positioning of both the bearing disc 36 and the rack 24, as well as the remaining axial and roll constraints for the bearing disc 36, are provided by the compressed O-ring member 38 in a somewhat compliant manner with respect to the threaded aperture 32.

As a consequence of its axially directed compression between the angular contact grooves 52 and 54, the O-ring member 38 also provides nominal pitch and yaw constraints upon the bearing disc 36 which are conically directed toward an apex 56. The actual location of the apex 56 is determined by the relative final locations of the lines of force through the angular contact grooves 52 and 54. In any case, the pitch constraint is directed about the apex 56 which is well within the rack 24 and thus physically remote from the bearing disc 36. Upon initial translational motion of the rack 24, the bearing disc 36 begins to move along with the rack 24. This tends to decompress leading edge portion 58 of the O-ring member 38 (i.e., that portion under the leading edge 60 of the bearing disc) and further compress trailing edge portion 62 of the O-ring member 38 (i.e., that portion under the trailing edge 64 of the bearing disc). The end result is a contrapitch rotation of the bearing disc 36 about the apex 56 so as to form a lubrication wedge between it and the rack 24. The kinematic design of the improved yoke assembly 34 permits the axis of the bearing surfaces 48 of the bearing disc 36 to be in precise alignment with the rack 24 and maintain a lubrication wedge therebetween which enables smooth movement of the rack 24.

During assembly, the adjuster plug 40 is threadably inserted into threaded aperture 32 and rotatably driven until surface 66 thereof contacts convex surface 68 of the bearing disc 36. Then the adjuster plug 40 is rotationally backed off a minimal predetermined distance, such as 10°, in order to permit some movement of the bearing disc 36 and rack 24. An internal lock nut 70 is then tightened against the adjuster plug 40 to maintain its position.

The minimal predetermined distance of 10° is significantly less than that normally encountered when assembling yoke assemblies of the prior art. This is enabled by the extra degree of freedom provided by the improved yoke assembly 34 whereby the tightening of the adjuster plug 40 against the bearing disc 36 can be accomplished in a more precise manner. The result is tighter control of the operating clearance between the adjuster plug 40 and bearing disc 36. This is important in minimizing rattle because it results in minimal possible separation between the pinion 20 and rack 24 as a consequence of dissimilar dirigible wheel impacts. This, in turn, minimizes the maximum closure velocity therebetween which minimizes any audible noise associated with closure.

Figure 4:
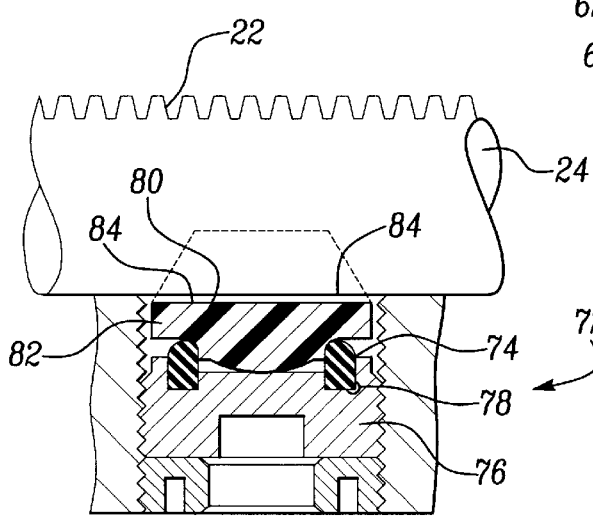
FIG. 4 is a sectional side view of a yoke apparatus configured in accordance with a first alternative preferred embodiment of the invention.

Referring now to FIG. 4, thereshown is a sectional side view of a second improved yoke assembly 72 comprised in a first alternative preferred embodiment of the present invention. The improved yoke assembly 72 comprises a molded elastomeric member 74 which is either formed directly within, and/or bonded to, an adjuster plug 76. The molded elastomeric member 74 is formed or bonded within a nominally outer angular contact region 78 of the adjuster plug 76. This results in the pitch and roll forces being directed in a similar manner to that described above with reference to the preferred embodiment. In addition however, the angular contact groove 80 on bearing disc 82 is partially relieved under the leading/trailing edge portions 84 thereof. This results in a reduction of the pitch stiffness of the elastomeric support for the bearing disc 82 while maintaining a relatively high roll stiffness. Independent selection of the pitch stiffness in this manner enables selective lubrication wedge optimization. In addition, forming the molded elastomeric member 74 directly within an adjuster plug 76 also eliminates handling a separate elastomeric member during assembly.

Figure 5:
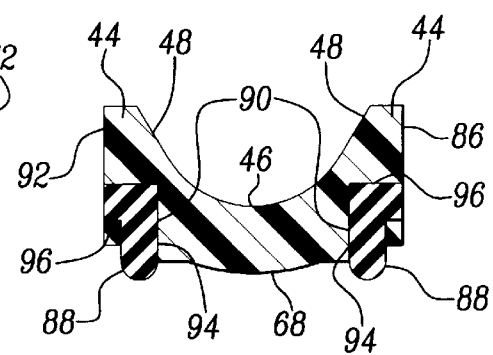
FIG. 5 is a sectional view of a bearing disc configured in accordance with a second alternative preferred embodiment of the invention.
Figure 6:
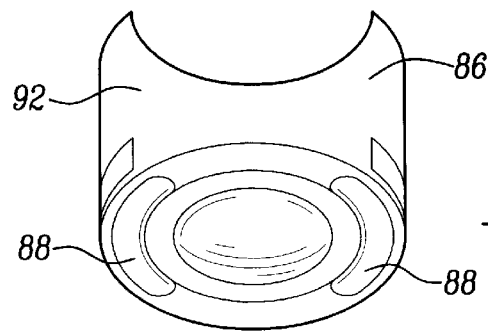
FIG. 6 is a perspective view of the bearing disc configured in accordance with the second alternative preferred embodiment of the invention.

Referring now to FIGS. 5 and 6, thereshown are sectional and perspective views of a bearing disc assembly 86 comprised in a second alternative preferred embodiment of the present invention. The bearing disc assembly 86 is used in conjunction with the adjuster plug 40 and similarly provides reduced pitch stiffness. In this case, kidney shaped elastomeric pads 88 are formed directly in laterally disposed pockets 90 formed in the arms 44 of a bearing disc 92.

Because the bearing disc 92 is typically formed of a plastic material having superior bearing qualities, it is difficult, or impossible to achieve a bond between the elastomeric material utilized for the elastomeric pads 88 and the bearing disc 92. For this reason, the pockets 90 are formed with a physically interlocking shape comprising axially oriented arms 94 and radially oriented arms 96. Since the elastomeric pads 88 are not bonded to the bearing disc 92, the elastomeric material is more compliant in the outwardly directed radial direction because of its freedom to move radially outward in the radially oriented arms 96. This contributes, in convoluted fashion, to the required inner angular contact nature of the pockets 90. In any case, since the elastomeric pads 88 are located laterally with reference to the axis of translation "A", laterally oriented stiffness (i.e., in the roll direction) is significantly greater than that in the pitch direction.

Accordingly, disclosed above are improved yoke assemblies of compact design which may be substituted for a conventional yoke assembly in any conventional rack and pinion steering system to significantly improve its smoothness of operation. The elastomerically supported bearing discs permit perfect alignment and improved lubrication of their support surfaces of the otherwise conventional steering system's rack. Accordingly, the rack moves smoothly in either direction with minimal hysteresis due to Coulomb friction and without the catching which is frequently associated with movement in one direction of the prior art devices.

While the present invention has been described in connection with the preferred embodiments of the various figures, it is also understood that other similar embodiments may be used or modifications or additions may be made to the described embodiments for performing the same function of the present invention without deviating therefrom. For instance, the preferred embodiment could be implemented by directly forming a circumferential elastomeric element on either of the bearing disc 36 or adjuster plug 40 as has been done on the adjusting plug 76 comprised in the second improved yoke assembly 72. Therefore, the present invention should not be limited to any single embodiment but, rather, construed in breadth and scope in accordance with the recitation of the appended claims.

I claim:

1. An apparatus for maintaining a rack and pinion in meshing engagement, said rack movable within a housing along an axis of translation therewithin, said apparatus comprising:

an adjuster plug member having an upper surface and being adjustably mounted withing a bore of said housing along an adjustment axis that is nominally orthogonal to said axis of translation;

a bearing disc member mounted within said housing generally along said adjustment axis between said upper surface of said adjuster plug member and said rack, said bearing disc member having an outer circumferential surface spaced inwardly and apart from an inner surface of said bore such that the bearing disc member is permitted movement from alignment with the axis of said bore in a direction orthogonal to the axis of translation of said rack when said rack is moved, and having at least one nominally cylindrical surface spaced apart from a lower surface, said nominally cylindrical surface formed to slidingly receive said rack, said lower surface disposed between a pair of diametrically opposed contact surface portions disposed radially inwardly from said circumferential surface; and at least one compliant member disposed between said adjuster plug member and said bearing disc member, said at least one compliant member having at least two portions biasingly contacting respective contact surface portions of said disc member to bold said disc member from said inner surface of said bore so that one of said contact portions may be compressed when said rack is moved along the axis of translation.

2. The apparatus of claim 1 wherein said at least one compliant member comprises an elastomeric material.

3. The apparatus of claim 1, wherein each said contact surface portion comprises an angular contact groove.

4. The apparatus of claim 1 wherein said adjuster plug member comprises an outer angular contact groove for receiving said at least one compliant member.

5. The apparatus of claim 1, wherein said adjuster plug further comprises a continuous groove forming said pair of diametrically opposed contact surface portions.

6. The apparatus of claim 5, wherein said continuous groove has a relieved portion extending towards said circumferential surface of said disc member to facilitate compression of said pair of contact portions.

7. The apparatus of claim 1, wherein said at least one compliant member is an O-ring.

8. The apparatus of claim 1, wherein said at least one compliant member is a pair of elastomeric pads mounted to one of said bearing disc member and said adjuster plug member.

9. The apparatus of claim 1, wherein each of said pair of diametrically opposed contact surface portions of said bearing disc comprise an angled surface such that a biasing force of said contact portion being compressed has a resultant force directed towards said rack.

* * * * *

UNITED STATES PATENT AND TRADEMARK OFFICE
CERTIFICATE OF CORRECTION

PATENT NO. : 5,802,919
DATED : 9/8/98
INVENTOR(S) : Edward H. Phillips

It is certified that error appears in the above-identified patent and that said Letters Patent is hereby corrected as shown below:

Column 2, line 43, delete "0-ring member" and insert --O-ring member--.
Column 2, line 65, delete "sliding" and insert --slider--.
Column 3, line 45, delete "raffle" and insert --rattle--.
Column 3, line 47, delete "Drawing" and insert --Drawings--.
Column 4, line 27, delete "28" and insert --21--.
Column 4, line 49, delete "disk" and insert --disc--.
Column 6, line 65, delete "withing" and insert --within--.
Column 7, line 21, delete "bold" and insert --hold--.
Column 7, line 25, after "1" insert --,--.
Column 8, line 1, after "each" insert --of--.
Column 8, line 2, delete "portion comprises" and insert --portions comprises--.
Column 8, line 3, after "1" insert --,--.

Signed and Sealed this

Seventeenth Day of August, 1999

Attest:

Q. TODD DICKINSON

*Attesting Officer*   *Acting Commissioner of Patents and Trademarks*